March 13, 1951 G. C. SZIKLAI 2,545,420

COLOR TELEVISION RECEIVING SYSTEM

Filed Dec. 31, 1947 2 Sheets-Sheet 1

INVENTOR
George C. Sziklai
BY Olin J. Mitchell
ATTORNEY

INVENTOR
George C. Sziklai
BY [signature]
ATTORNEY

Patented Mar. 13, 1951

2,545,420

UNITED STATES PATENT OFFICE 2,545,420

COLOR TELEVISION RECEIVING SYSTEM

George C. Sziklai, Princeton, N. J., assignor to Radio Corporation of America, a corporation of Delaware Application December 31, 1947, Serial No. 795,031

6 Claims. (Cl. 178—5.4)

Figure 1:
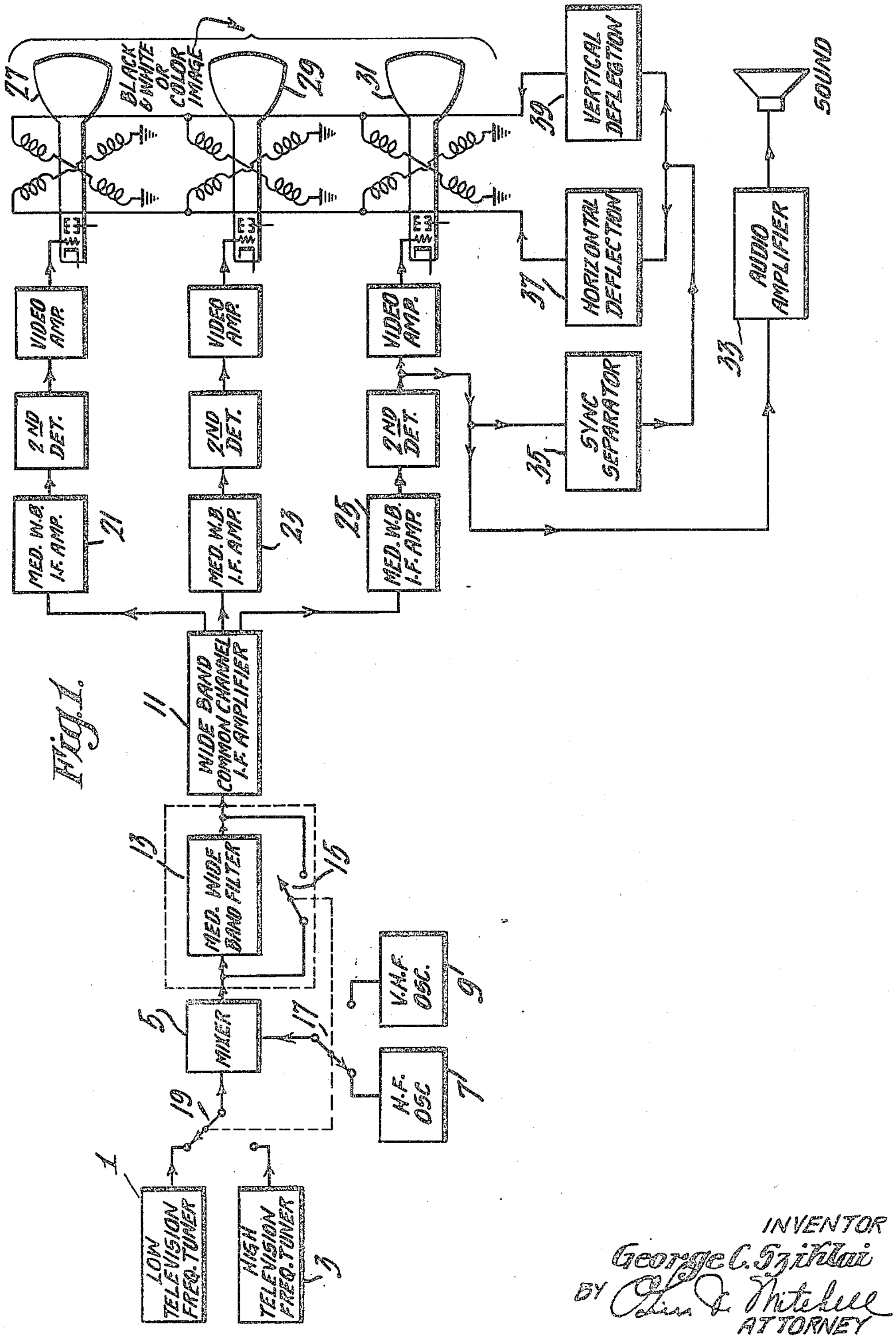

This invention relates to television and more particularly to receiving set arrangements for the reception of signals to produce black and white images or images in substantially their natural color.

It is generally well known in the television art that the transmission of visual information by electricity is characterized by the fact that a single electrical transmission circuit can carry but one item of information at a time. By analyzing the image into its image elements and deriving therefrom a signal train of impulses by an orderly sequence of scanning, the image may be reproduced at a remote location by reconstruction of the image in the same orderly sequence of scanning.

It is also well known that images in substantially their natural color may be reproduced by dividing the image into its selected component color and reproducing the image by a super-positioning in accurate registry of the several selected component color images.

It is therefore possible that images in substantially their natural color may be transmitted over electrical paths by not only dividing the images into their image elements, but also dividing images into selected component color images.

It follows that in order to accomplish the transmission of images in substantially their natural color with the same degree of fidelity that is characteristic of the transmission of black and white images, it is necessary to transmit additional information which requires, if the information is to be transmitted simultaneously, an additional signal pass band.

Although it would seem that the transmission of three different selected component color images simultaneously would require three times as much information and therefore three times the band width as the transmission of black and white images, this is not necessarily true, as has been very well demonstrated by A. N. Goldsmith in U. S. Patent 2,335,180; in my copending U. S. application, Serial No. 760,400, filed July 11, 1947; and in U. S. patent of Alfred C. Schroeder, Patent No. 2,535,552, and in U. S. application of Alda V. Bedford, Serial No. 714,750, filed December 7, 1946.

The Goldsmith patent referred to immediately above, although indicating that three times the band width of black and white television signals is not required for the transmission of images in substantially their natural color, indicates that a wider band width is required for color signals over the usual black and white signals in order to provide substantially equal image detail.

Color television systems which have been proposed, such as, for example, those proposed by Goldsmith supra, include for the amplification of the color video signals an amplifier having a relatively wide frequency band of response and amplification. This is necessary, of course, in order to faithfully amplify the full range of frequency of the color television signals.

Wide band amplifiers generally are faced with one important difficulty which becomes apparent in certain types of electrical signaling. This difficulty is a form of interference called "cross talk." Cross talk is a term usually given to mutual interference between adjoining electrical circuits or, in the case of wide band amplifiers, to the mutual interference between signals having frequencies displaced throughout the pass band.

Normally, in wide band amplifiers, this difficulty of cross talk does not become objectionable because of the fact that the same signal information is usually spread throughout the pass band. In the transmission of color television signals, however, different information is transmitted through the various portions of the pass band. A certain amount of interference is therefore existent between the various sections of the pass band, but in view of the fact that this interference is limited to interference between color representative signals which are separated within the band, no serious degradation of image detail results.

If, however, the relatively wide pass band is employed without change for the reception of the lesser pass band requirement of black and white video signals, adjacent signal channels may be included in the frequency covered by the pass band or auxiliary signals may be included to such an extent as to cause serious inteference with the reproduction of images in black and white.

According to this invention, a band pass filter having characteristics suitable for the reception of black and white image signals is included in the circuit when it is desired to receive black and white signals. The filter arrangement is eliminated during the reception of color television signals.

It is customary that color television signals and black and white television signals will be allocated to different radio frequency spectrums requiring different tuning arrangements for the receiver. According to other forms of this invention, gauged switching arrangements are provided for not only switching the filter in and out of the circuit, as required, but also selecting the proper heterodyning oscillator and radio frequency tuner.

A primary object of this invention is to provide an improved television system.

Another object of this invention is to provide for the reception of black and white or color on the same receiving equipment.

Figure 2:
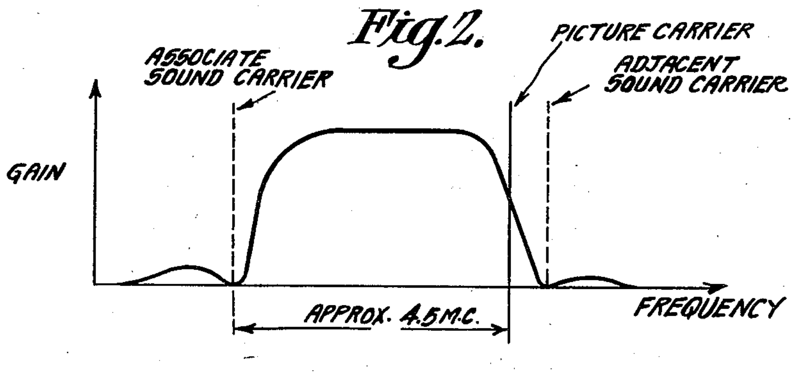
Figure 3:
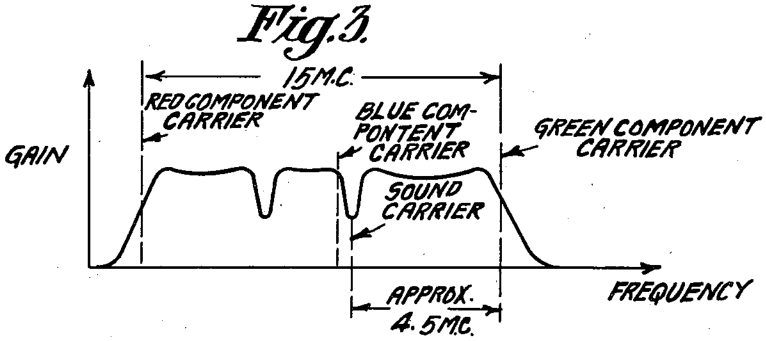
Figure 4:
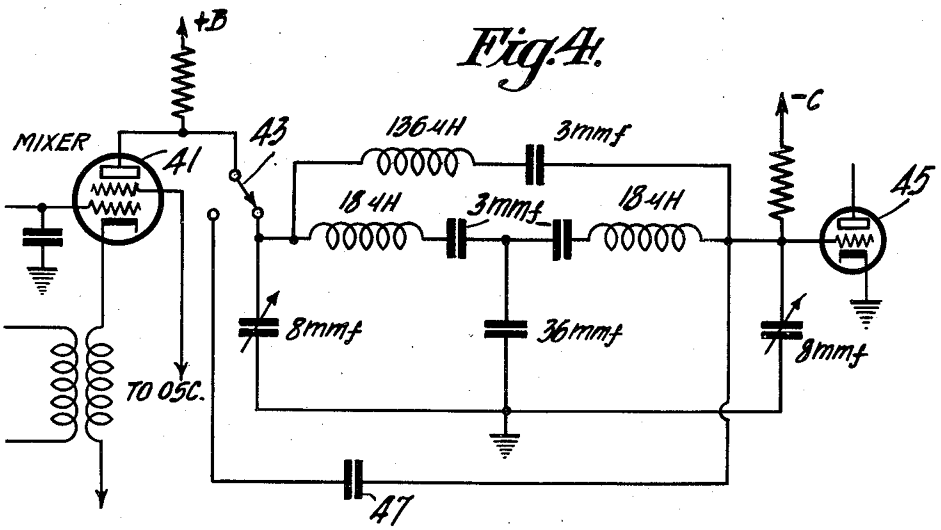

Other and incidental objects of the invention will be apparent to those skilled in the art from a reading of the following specification and an inspection of the accompanying drawing in which:

Figure 1 shows by block diagram one form of this invention;

Figures 2 and 3 aid in a graphic manner the explanation of the operation of this invention; and Figure 4 shows in detail by circuit diagram one suitable filter arrangement which may be employed in the practice of this invention in its various forms.

Turning now in more detail to Figure 1, there is illustrated a color television receiver, together with an associated sound system.

A low frequency television tuner 1 and a high frequency television tuner 3 are switchably connected to mixer 5.

A high frequency oscillator 7 and a very high frequency oscillator 9 are also switchably connected to mixer 5.

Signals from mixer 5 are transmitted to wide band common channel intermediate frequency amplifier 11 through one of two paths. During the reception of black and white television signals, energy from mixer 5 passes through medium wide band filter 13. During the reception of color images, a switch 15 is closed to short-circuit the medium wide band filter 13.

A dotted line connecting switches 15, 17 and 19 is indicated to show one form of this invention involving a single manual control for switches 15, 17 and 19.

It has been assumed, for purposes of example, that the low frequency tuner 1 and the high frequency oscillator 7 are to be employed in the reception of black and white images, while the high frequency tuner 3 and the very high frequency oscillator 9 are employed in the reception of color signals.

Signal energy from wide band common channel I. F. amplifier 11 is divided into the three medium wide band I. F. amplifiers 21, 23 and 25.

In the form of the invention shown, the I. F. amplifiers 21, 23, and 25 are so designed and contain circuit constants such that the signal energy from wide band I. F. amplifier 11 is divided in accordance with the type of color representative signals they are adapted to transmit.

Any suitable arrangement of intermediate frequency amplifier is satisfactory for the practice of this invention, but the combination intermediate frequency amplifier shown in blocks 11, 21, 23 and 25 is shown and described in detail in my co-pending U. S. application, Serial No. 760,400, filed July 11, 1947, previously referred to. In accordance with the form of intermediate frequency amplifier shown in Figure 1 and described in detail in my co-pending application referred to immediately above, an improved video amplification arrangement is provided having a primary object for the efficient amplification of independent signal trains representing selected component colors of a composite image signal. The combined signal trains are amplified to a predetermined level before separation, and then are amplified independently of one another.

The signal energy from the intermediate frequency amplifiers 21, 23 and 25 is passed to the image reproducing tubes which may, for example, take the form of the kinescopes 27, 29 and 31.

The images of kinescopes 27, 29 and 31 are combined to form a natural color image or a black and white image, depending upon the position of the switching arrangement including switches 15, 17 and 19.

Physical arrangements for combining the images of tubes 27, 29 and 31 are well known in the color television art and may, for example, take the form shown in an article entitled "Simultaneous color television system," beginning on page 861 of the "Proceedings of the Institute of Radio Engineers" for September 1947.

The accompanying sound signal amplified in audio amplifier 33 is obtained from the channel including intermediate frequency amplifier 25 in the usual manner. Likewise, the synchronizing signal for the system is obtained from the channel involving intermediate frequency amplifier 25 and separated in sync separator 35 to produce horizontal and vertical deflection by horizontal deflection generator 37 and vertical deflection generator 39.

Sync separation and deflection signal generation are believed at this time to be so well known in the television art that no further detailed description is necessary here.

In the operation of the form of the invention shown in Figure 1, it will be seen that during the reception of the relatively wide frequency band color television signals, switch 15 is closed to short-circuit the medium wide band filter 13. In another form of the invention, the switching arrangement is provided to select the medium wide band filter 13 in the case of black and white image reception, rather than short out the filter 13 during color reception. The latter form suggested may be preferable, in view of the fact that in the selection of the filter 13, as distinguished from shorting out the filter 13, the capacity to ground of the circuit components of the filter 13 will not be included in the circuit.

During the reception of black and white images, however, the medium wide band filter 13 is included in the circuit to eliminate that portion of the wide band passed by the wide band common channel I. F. amplifier 11, which is not required for the reception of the black and white signals.

Turning now to Figure 2, there is shown graphically one typical form of pass band required for the transmission of high quality black and white representative signals.

It will be noted that the width of the pass band of black and white representative signals shown in Figure 2 is approximately 6 mc., while a typical pass band required for the transmission of equivalent detail in color images, as illustrated in Figure 3, is about 15 mc. wide. It will be seen that if an amplifier capable of passing 15 mcs. is employed for the reception of black and white representative signals, an excess of approximately 9 mcs. is had to receive cross-talk from additional channels, and undesired noise signals. Furthermore, certain filter provisions will be required to provide for vestigial sideband reception. According to this invention in some of its forms, the filter arrangement provided for eliminating unnecessary noise and cross-talk may also be employed as the vestigial sideband filter for the proper reception of black and white signals.

Turning now in more detail to Figure 4, there is shown by circuit diagram one suitable filter arrangement having typical values of resistance, capacity and inductance illustrated for the purpose of example. Other circuit constants may be employed without departing from the spirit of this invention.

The mixer tube 41 and associated circuit elements may be substituted for the block 5 of Figure 1. It is employed to combine the radio frequency input signal with the local heterodyning oscillators.

Signal energy from the mixer tube 41 is transmitted to switch 43 which, in the position shown, furnishes the signal energy to the filter circuit arrangement involving appropriately selecting inductances and capacity to impress on the control electrode of tube 45 a signal pass band of the shape shown in Figure 2 above.

If, however, switch 43 is thrown to the left, the signal energy from mixer tube 41 will be transmitted through condenser 47 to the control electrode of tube 45, thus omitting the filter from the circuit for the reception of wide band or color signals.

Having thus described the invention, what is claimed is:

1. A television receiving system adapted for the reception of either color video signals or black and white video signals, a signal amplifier having a pass band whose width is substantially equal to the band width of said color video signals, a signal filter having a pass band substantially equal to the band width occupied by said black and white video signals, and a switching arrangement connected to said signal filter to include said signal filter operatively in the system during reception of said black and white video signals and to exclude the said filter from the system during the reception of said color video signals.

2. A television receiving system adapted for the reception of both color video signals and black and white video signals occupying a signal band whose width is narrower than the signal band occupied by said color video signals, a signal amplifier having a pass band substantially equal to the band width of said color video signals, a signal filter having a pass band substantially equal to the band width of said black and white video signals, and a switching arrangement connected to said signal filter to include said signal filter in the system only during reception of said black and white video signals.

3. A television receiving system adapted for the reception of both relatively wide signal frequency band color video signals and relatively narrow band black and white video signals, and wherein said color video signals are transmitted on a carrier having a different frequency than the frequency of the carrier upon which said black and white video signals are transmitted, a signal amplifier having a signal pass band substantially equal to the band width of said color video signals, a signal filter having a signal pass band substantially equal to the band width of said black and white video signals, a heterodyning oscillator circuit arrangement for said black and white video signal carrier, a heterodyning oscillator circuit arrangement for said color video signal carrier, and a switching arrangement connected to said signal filter to take said signal filter out of the system during the reception of said color video signals, said switching arrangement also selectively connected to said heterodyning oscillator circuit arrangements.

4. A television receiving system adapted for the reception of both color video signals and black and white video signals, and wherein said color video signals are transmitted on a carrier having a different frequency than the frequency of the carrier upon which said black and white video signals are transmitted, a signal amplifier having a pass band substantially equal to the useful band width of said color video signals, a signal filter having a pass band substantially equal to the useful band width of said black and white video signals, a carrier signal tuning circuit for said black and white video signal carrier, a carrier signal tuning circuit for said color video signal carrier, and a switching arrangement connected to said signal filter to short said signal filter out of the system only during the reception of said color video signals, said switching arrangement also connected to said carrier signal tuning circuits to select the appropriate carrier signal tuning circuits for reception of color or black and white video signals.

5. A television receiving system adapted for the reception of both color video signals and black and white video signals occupying a signal band whose width is narrower than the signal band occupied by said color video signals, and wherein said color video signals are transmitted on a carrier having a different frequency than the frequency of the carrier upon which said black and white video signals are transmitted, a signal amplifier having a pass band substantially equal to the band width of said color video signals, a signal filter having a pass band substantially equal to the band width of said black and white video signals, a heterodyning oscillator circuit arrangement for said black and white video signal carrier, a heterodyning oscillator circuit arrangement for said color video signal carrier, a carrier signal tuning circuit for said black and white video signal carrier, a carrier signal tuning circuit for said color video signal carrier, and a switching arrangement connected to said signal filter to include said signal filter operatively in the system only during reception of said black and white video signals, said switching arrangement also connected to said heterodyning oscillator circuit arrangements, and said carrier signal tuning circuits to select the appropriate heterodyning oscillator circuit arrangements and carrier signal tuning circuits for reception of color or black and white video signals.

6. A television receiving system adapted for the reception of both color video signals and black and white video signals occupying a signal band whose width is narrower than the signal band occupied by said color video signals, and wherein said color video signals are transmitted on a carrier having a different frequency than the frequency of the carrier upon which said black and white video signals are transmitted, a signal amplifier having a pass band substantially equal to the band width of said color video signals, a signal filter having a pass band substantially equal to the band width of said black and white video signals, a heterodyning oscillator circuit arrangement for said black and white video signal carrier, a heterodyning oscillator circuit arrangement for said color video signal carrier, a carrier signal tuning circuit for said black and white video signal carrier, a carrier signal tuning circuit for said color video signal carrier, and a switching arrangement connected to said signal filter to include said signal filter in the system only during reception of said black and white video signals, said switching arrangement also connected to said heterodyning oscillator circuit arrangements, and said carrier signal tuning circuits to select the appropriate heterodyning oscillator circuit arrangements and carrier signal tuning circuits for reception of color or black and white video signals, said switching arrangement comprising a plurality of mechanically coupled electric switches having a single manual control.

GEORGE C. SZIKLAI.

REFERENCES CITED

The following references are of record in the file of this patent:

UNITED STATES PATENTS

| Number | Name | Date |
|---|---|---|
| 2,253,292 | Goldsmith | Sept. 19, 1941 |
| 2,301,395 | Goldsmith | Nov. 10, 1942 |
| 2,329,339 | De Baun | Sept. 14, 1943 |
| 2,333,969 | Alexanderson | Nov. 9, 1943 |
| 2,335,180 | Goldsmith | Nov. 23, 1943 |